United States Patent
Yacoub

(10) Patent No.: US 9,121,314 B2
(45) Date of Patent: Sep. 1, 2015

(54) METHOD FOR PROTECTING A DPF OF AN INTERNAL COMBUSTION ENGINE

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 13/734,692

(22) Filed: Jan. 4, 2013

(65) Prior Publication Data

US 2013/0174536 A1 Jul. 11, 2013

(30) Foreign Application Priority Data

Jan. 5, 2012 (DE) .................. 10 2012 200 097

(51) Int. Cl.
*F01N 3/00* (2006.01)
*F01N 9/00* (2006.01)
*B60W 10/06* (2006.01)
*B60W 10/08* (2006.01)
*F02N 11/08* (2006.01)
*B60W 20/00* (2006.01)
*F02D 41/02* (2006.01)

(52) U.S. Cl.
CPC ............... *F01N 9/00* (2013.01); *B60W 10/06* (2013.01); *B60W 10/08* (2013.01); *B60W 20/00* (2013.01); *B60W 20/1082* (2013.01); *B60W 20/40* (2013.01); *F02D 41/0235* (2013.01); *F02N 11/0818* (2013.01); *B60W 2530/12* (2013.01); *B60W 2710/0622* (2013.01); *B60W 2710/0694* (2013.01); *B60Y 2300/476* (2013.01); *B60Y 2400/432* (2013.01); *F02D 41/029* (2013.01); *Y02T 10/42* (2013.01); *Y02T 10/54* (2013.01); *Y02T 10/6286* (2013.01)

(58) Field of Classification Search
CPC ..... F01N 9/00; B60W 10/08; B60W 20/1082; B60W 20/40; F02D 41/0235; F02D 41/029; F02N 11/0818; B60Y 2400/432
USPC .......................................... 60/274
See application file for complete search history.

(56) References Cited

U.S. PATENT DOCUMENTS

| 2007/0204601 A1* | 9/2007 | Ishii et al. ............. 60/295 |
| 2009/0043437 A1* | 2/2009 | Shiino ..................... 701/22 |
| 2011/0072802 A1* | 3/2011 | Bidner et al. ........... 60/287 |
| 2014/0245719 A1* | 9/2014 | Mitchell et al. ........ 60/274 |

FOREIGN PATENT DOCUMENTS

EP     1785605 A2    5/2007

* cited by examiner

*Primary Examiner* — Jason Shanske
(74) *Attorney, Agent, or Firm* — Greg Brown; Alleman Hall McCoy Russell & Tuttle LLP

(57) ABSTRACT

The invention relates to a method for protecting a DPF in the exhaust section of an internal combustion engine of a motor vehicle from unintentional combustion of soot in the DPF. According to the invention, the motor vehicle is a hybrid vehicle having at least one electric machine and is able to be driven exclusively by one or more electric machine(s) for some time. The vehicle is operated in a DPF protection mode if the system detects that unintentional combustion of soot is taking place or threatening to take place in the DPF, initiating an automatic decoupling of the combustion engine from the wheel drive train, forward propulsion demands by the driver are met exclusively with the aid of the one or more electric machine(s), and the combustion engine is switched off completely or is operated with stable stoichiometric combustion.

18 Claims, 4 Drawing Sheets

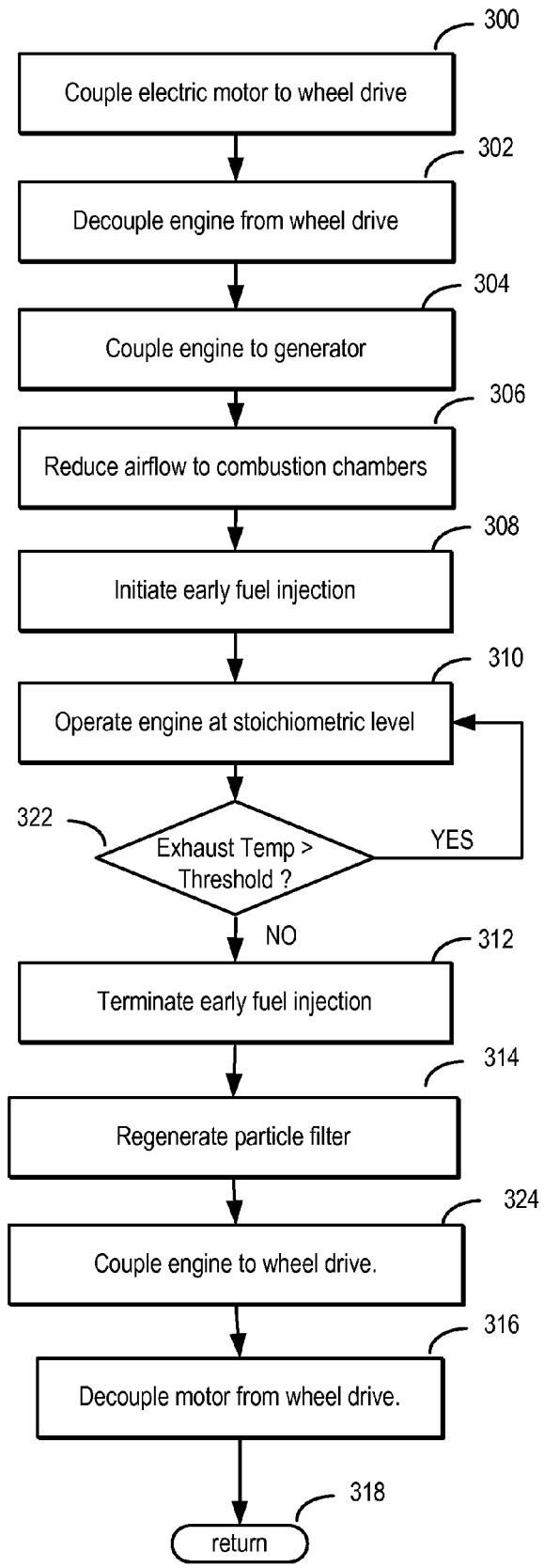

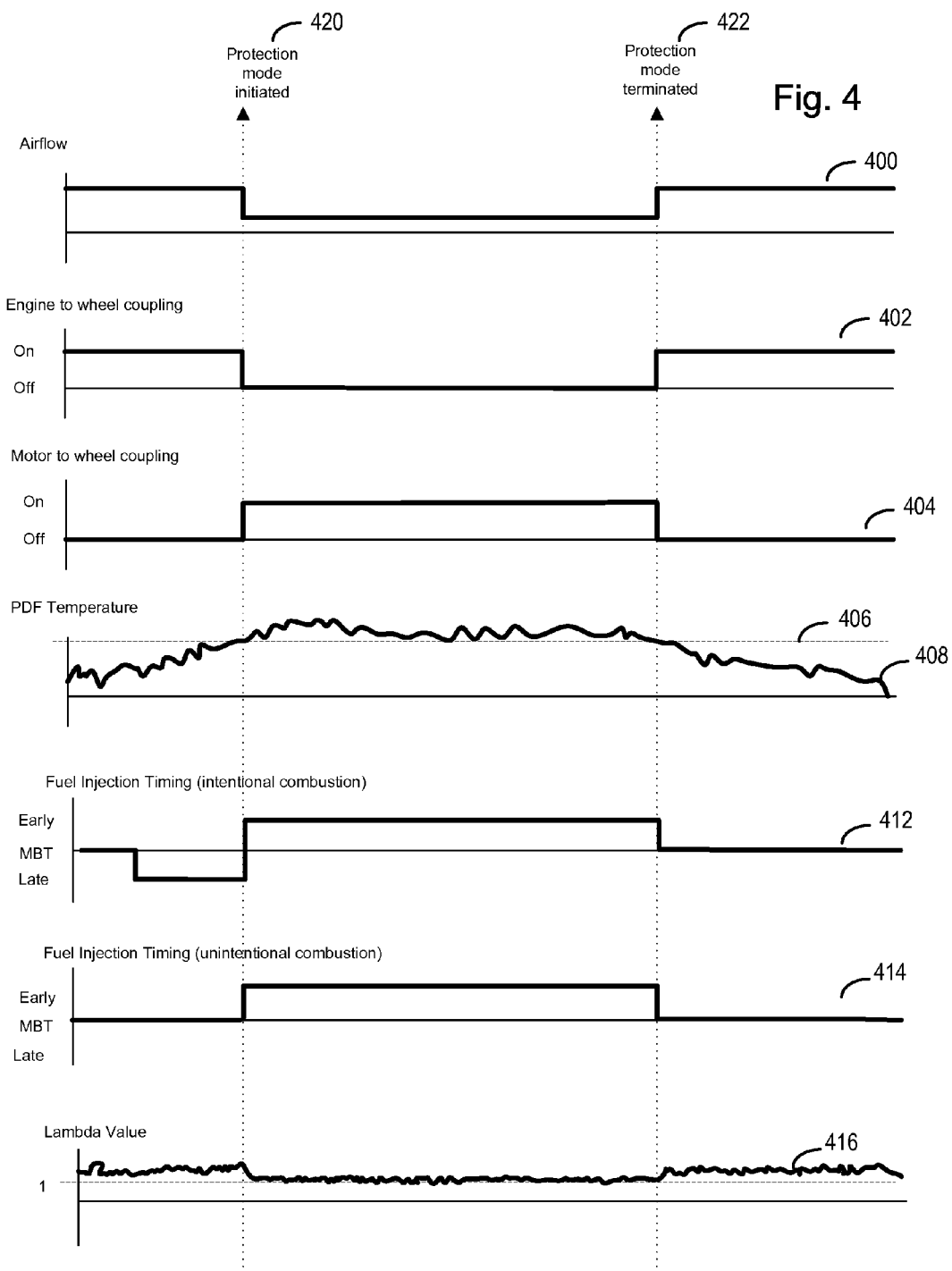

METHOD FOR PROTECTING A DPF OF AN INTERNAL COMBUSTION ENGINE

CROSS REFERENCE TO RELATED APPLICATIONS

The present application claims priority to German Application 102012200097.6, filed on Jan. 5, 2012, the entire contents of which are hereby incorporated by reference for all purposes.

BACKGROUND AND SUMMARY

The present disclosure relates to a method for protecting a diesel particulate filter (DPF) in the exhaust section of an internal combustion engine of a motor vehicle from unintentional combustion of soot in the DPF and high temperatures with the DPF and to a motor vehicle set up to carry out the method.

A wall flow DPF in the exhaust section of the internal combustion engine of a vehicle stores solids contained in the exhaust gas, in particular soot, primarily on the wall of the DPF. The solids which have accumulated on the internal wall of the DPF increase flow resistance and hence exhaust gas backpressure, reducing engine power and increasing fuel consumption. In order to return the exhaust gas backpressure to its desired value, the DPF may be regenerated upon accumulation of a pre-determined mass of soot build-up within the DPF. Regeneration can be done passively through the engines exhaust heat or may be initiated intentionally by a control system.

In the case of a DPF which is heavily laden with soot, the exothermal heat generated in regeneration may raise the temperature of the DPF to a point that may compromise its structural of chemical integrity leading to degradation of the DPF system. This degradation to the DPF can be lessened by monitoring the temperature of the exhaust gas emerging from the filter, for example, and reducing the oxygen concentration in the exhaust gas entering the DPF to very low levels if combustion of soot in the DPF occurs unintentionally or at temperature above a determined degradation threshold is detected, thus reducing the exothermal reaction resulting from the combustion of soot. Lowering the oxygen concentration of exhaust gas can be achieved by operating in stable stoichiometric combustion conditions wherein substantially all (e.g., more than 98% of) fuel is combusted, which leads to sustained low oxygen concentrations in the engine exhaust gas and hence to a reduction in the soot combustion rate in the DPF. As an alternative, the exhaust gas mass flow through the DPF may be set to zero by switching off the internal combustion engine completely. However, in the case of lean burn engines such as diesel engines, it is not possible to operate the internal combustion engine a stoichiometric conditions over a wide range of engine operating states.

The inventors recognized the above interrelated issues, and that these operating constraints may be advantageously addressed in hybrid vehicles by initiating a DPF protection mode when exhaust temperature from the DPF exceed a threshold by decoupling the combustion engine from the wheel drive train during regeneration such that the vehicle is propelled solely by the electric motor, and the engine speed and/or load can be set to a range enabling stable combustion at stoichiometry. Further, by coupling the engine to an alternator generating power for a motor battery, fuel loss can be mitigated and battery charge preserved.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

FIG. 3 represents a sample routine within the routine of FIG. 2.

FIG. 4 illustrates a sample time line of the routine in FIG. 3.

DETAILED DESCRIPTION

Figure 1:
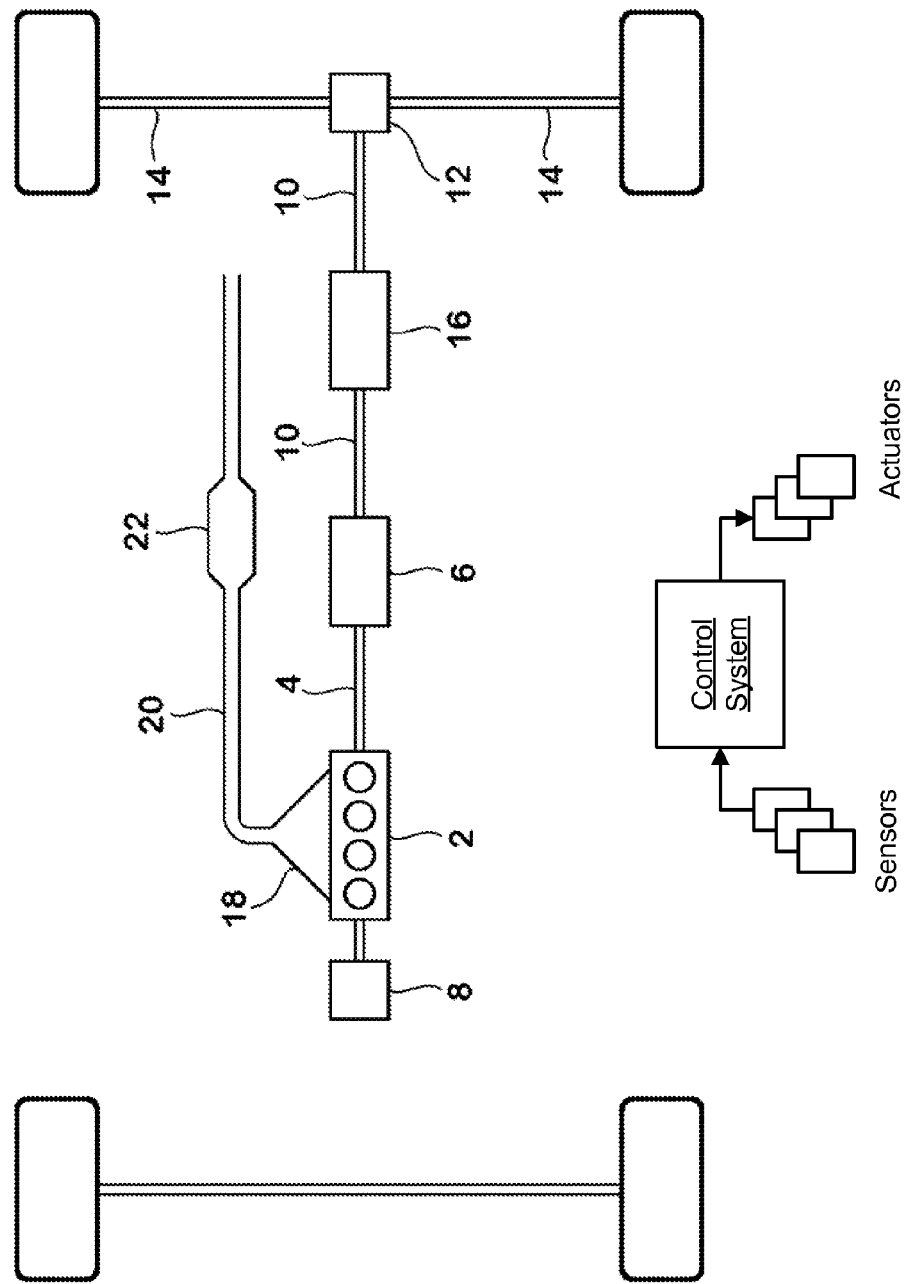
FIG. 1 is a schematic representation of an embodiment of a vehicle with an internal combustion engine and hybrid motor.

Herein, the stoichiometric air-to-fuel ratio (AFR) is defined as the minimum AFR required for all of the fuel to burn during combustion, referred to as stoichiometric combustion. For the purposes of this disclosure, the lambda ($\lambda$) rate will refer to the ratio of a presiding AFR to the stoichiometric AFR wherein mixtures with $\lambda > 1$ are referred to as rich burn mixtures and mixtures with $\lambda < 1$ are referred to as lean burn mixtures. Stable stoichiometric combustion leads to sustained low oxygen concentrations in the engine exhaust gas, an element present in the combustion of soot, thus reducing the soot combustion rate in the DPF, for example a wall-flow DPF, and thereby protecting it. This may be used independent of, or in combination with, the initiation of advanced combustion timing, such as advanced injection timing or advanced ignition timing. However, in the case of lean burn engines such as diesel engines, it is not possible to operate the internal combustion engine with a $\lambda$ value of 1 over a wide range of engine operating states. The method protects the DPF in a vehicle by initiating or transitioning to stoichiometric combustion without prohibiting operation over a wide range of operating conditions in diesel engines with one or more electric motors, but yet optionally operating in a selected speed and/or airflow/torque range during the DPF protection/stoichiometric operation.

Extended operation of the combustion engine may cause some amount of solids from exhaust gas to build up on the walls of the DPF leading to back pressure on the exhaust system. This back pressure may eventually lead to decreased fuel efficiency and energy production of the engine. Soot can be removed from the DPF by regeneration in which high temperatures within the DPF allow the carbons to oxidize and "burn" off of the DPF, exiting via the exhaust system. This can occur passively wherein the heat required for this process is provided by the heat from exhaust gas from normal operation. It can also be initiated by a control system intentionally heating the exhaust gas to a temperature required for soot combustion. A method for raising exhaust gas heat may include retarding the ignition within an engine chamber by delaying fuel injection into the chamber later in the compression stroke. By reducing the volume available for expansion after combustion, exhaust may enter the exhaust system at a higher temperature. Similarly, advanced ignition timing can be achieved by injecting fuel into the chamber earlier in the compression stroke allowing more room for expansion and lower exhaust heat. Lowering exhaust heat may reduce or terminate combustion within the DPF. Herein, "retarded" and "advanced" ignition is relative to the maximum breaking torque's (MBT's) ignition point within a cylinder's compression cycle for the vehicle's presiding operating conditions.

In hybrid vehicles the torque delivered to the wheel drive train for propulsion may be provided by an internal combustion engine or an electric motor powered by a battery. Embodiments of an electric motor battery are equipped to receive charge, in some part, by conversion of rotational kinetic energy generated by the internal combustion engine into electric current via a generator or alternator. Hybrid vehicles with the capacity to be driven exclusively by an electric motor, for at least some time, may have power paths that couple engine and electric motor to the wheel drive train independently and in combination enabling the engine to be automatically decoupled from the wheel drive train.

Figure 2:
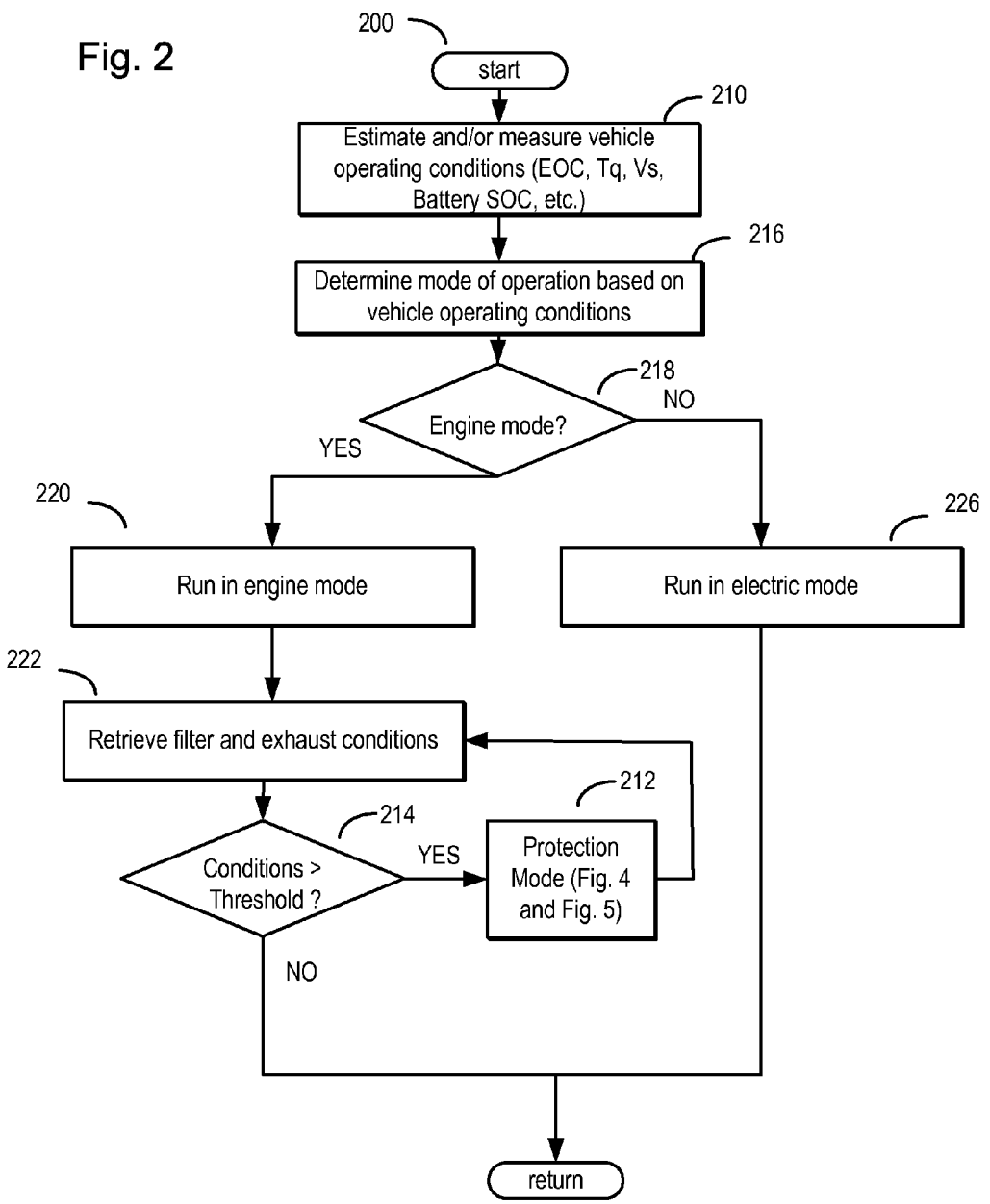
FIG. 2 represents a sample routine.

An embodiment of an engine motor system within a hybrid vehicle is schematically represented in FIG. 1 that operates via a routine diagrammed in FIG. 2. In the case of exhaust temperature exceeding a degradation threshold or a threshold that may contribute to or be indicative of unintentional combustion of soot in the DPF, the vehicle control system may initiate a filter protection mode wherein the internal combustion engine may be decoupled, and the vehicle driven by electric motor alone as is shown in FIG. 3. While the vehicle is in filter protection mode the engine is allowed to continue running in a steady operating state, in which there is stable stoichiometric combustion, which leads to sustained low oxygen concentrations in the engine exhaust gas and hence to a reduction in the soot combustion rate in the DPF. Temperature may be determined by sensors within the exhaust manifold, exhaust system, or within the DPF. Conditions that may contribute to, or be indicative of, unintentional combustion may also be detected by temperature sensors but may also be determined by methods not otherwise identified within this disclosure. FIG. 4 shows a timeline of operating conditions when filter protection mode is active and stable stoichiometric combustion is achieved, in particular, by the fact that the internal combustion engine is operated with a λ value close to one. As an alternative the exhaust gas mass flow through the DPF may be set to zero by switching off the internal combustion engine completely (not shown).

Upon the return of the exhaust temperature to a threshold, and/or the potential for unintentional combustion in the DPF reduced, the internal combustion engine may be recoupled to the wheel drive train and can be used more or less exclusively for driving the vehicle forward. However, the purely electric-motor drive state may also be maintained for longer in order, for example, to perform active regeneration of the DPF after the ending of the actual filter protection phase.

The schematic diagram of FIG. 1 is an embodiment of a four-wheel motor vehicle with parallel hybrid drive; however, the method described can also be carried out with other types of hybrid drive. The vehicle contains a diesel internal combustion engine 2, which is coupled to the input of a clutch/transmission unit 6 by an engine output shaft 4. The engine 2 may further drive an alternator 8. The output of the clutch/transmission unit 6 may be coupled by a transmission output shaft 10 to the input of a differential 12, the outputs of which are coupled by axle shafts 14 to two wheels of the motor vehicle. The transmission output shaft 10, the differential 12 and the axle shafts 14 form a wheel drive train.

The transmission output shaft 10 is furthermore coupled to an electric motor 16. The electric motor 16 and an associated power storage device, such as a vehicle battery (not shown), are dimensioned in such a way that the electric motor 16 can drive the motor vehicle, for a certain time, alone while the clutch of the clutch/transmission unit 6 is open. The internal combustion engine 2 comprises an exhaust manifold 18, which leads to an exhaust pipe 20, which carries the exhaust gases of the internal combustion engine 2 through a DPF 22.

Further, the embodiment includes a control system that may receive input from sensors that may include a temperature sensor in the exhaust manifold 18 and/or in the DPF 22. The control system may comprise actuators in the form of electronics and power electronics for carrying out the methods described.

If the engine 2 is operating, the DPF 22 may be continuously monitored to determine whether a temperature threshold has been reached that may contribute to unintentional combustion of soot is taking place therein or compromise the structural or chemical integrity of the DPF 22. This may be accomplished, for example, by temperature sensors within the DPF 22 or the exhaust manifold 18. It may also be possible to determine whether unintentional combustion in the DPF 22 is expected to occur in the near future if the current engine operating conditions do not change. Monitoring can also be performed if active regeneration of the DPF 22 is currently being carried out.

Upon system detection of unintentional combustion in the DPF 22 or the exceeding of a temperature threshold, the filter protection mode is initiated in order to suppress unintentional combustion and lower exhaust temperature.

In the DPF protection mode, the engine 2 may be automatically decoupled from the wheel drive train by means of the clutch/transmission unit 6, and forward propulsion may be met exclusively with the aid of the electric motor 16. Meanwhile, the air intake to the engine 2 may be decreased to achieve a λ value of one, inducing stable stoichiometric combustion in the engine 2. Thus, the engine may continue steady operation while reducing the oxygen concentrations in the engine exhaust gas in a sustained manner consequently reducing the soot combustion rate in the DPF 22. As an alternative, the exhaust gas mass flow through the DPF 22 may be set to zero by switching off the internal engine 2 completely. Filter protection mode may further include retarding ignition timing in the engine to lower the temperature of the exhaust delivered to the DPF.

In addition to, or in replace of, the filter protection mode method described above, the power output of the engine 2 may be set to a level which approximately matches the amount of power that the alternator 8 can generate and feed to the vehicle battery or to the electric motor 16, thus reducing fuel waste and allowing the filter protection mode to, if desired, continue for longer than would be possible with the aid of the vehicle battery alone. In the case of unintentional regeneration this may allow for active regeneration initiated by the control system that may be achieved, in some part, by increasing exhaust heat possibly by advanced ignition timing Upon exhaust and/or DPF temperature falling below the threshold and/or the reduced potential or termination of unintentional combustion in the DPF 22, filter protection mode may be deactivated and the engine 2 re-coupled to the wheel drive train. The re-coupling may also occur if the general forward propulsion demands of the driver have changed to such an extent that the engine 2 can meet these demands even with stoichiometric combustion.

There may be one or more electric motor(s) provided for driving the vehicle and may either be an electric motor or an electric machine that may be operated selectively as an electric motor or a generator to enable braking energy to be recovered.

The procedure of FIG. 2 further describes the operating method of a hybrid vehicle wherein the sensors of a control system measure operating conditions at 210 and the control system determines the vehicle operation based on those measurements at 216. If the vehicle receives instructions to operate in engine mode at 218 the engine will provide torque to the wheels via internal combustion at 220. Otherwise, the engine may operate in electric mode wherein torque is provided by an electric motor at 226. In engine mode, the exhaust temperature or conditions within the DPF may be monitored at 222. Upon those conditions exceeding a threshold the control system may initiate filter protection mode at 212 until the conditions have fallen below threshold value at which point the procedure may repeat.

In the event of the initiation of filter protection mode the method illustrated diagrammatically in FIG. 3 may occur, wherein the electric motor is coupled to the wheel drive train at 300. The engine may then be decoupled to the wheel drive train at 302 and coupled to a generator at 304. This generator may be attached to a battery to provide power to the electric motor. If an electric generator, such as an alternator or a "starter/generator", is provided, it may be coupled rigidly to the internal combustion engine or may be coupled to the internal combustion engine independently of the electric machine provided for driving the vehicle. In some embodiments, the internal combustion engine may drive the electric generator while in filter protection mode, and may be operated with an output power which approximately corresponds to the maximum power generating capacity of the electric generator. In general, this may be possible even if the internal combustion engine is being operated with a λ value close to one. The electric current generated by the internal combustion engine may further be fed to a power storage device, such as a vehicle battery, supplying the one or more electric machines provided for driving the vehicle, thus extending the time during which the vehicle can be operated in the filter protection mode before the power storage device is exhausted. The vehicle propulsion may then continue unhindered via torque provided by the electric motor while the engine operates in filter protection mode conditions, including a reduction of intake air at 306 to a stoichiometric AFR at 310 resulting in reduced oxygen deposited in the DPF from exhaust thus hindering unintentional combustion in the DPF. This process may be aided by injecting fuel into the combustion chamber earlier in the combustion process resulting in less heat emitted in the exhaust process further reducing the probability of unintentional combustion by lowering the temperature of exhaust delivered to the DPF.

Upon return of the DPF and exhaust conditions to a threshold value the engine may actively regenerate the DPF at 314 via a control routine. This may occur before the engine is re-coupled to the wheel drive train at 324 and the motor de-coupled at 316 thus deactivating protection mode. The extended use of the electric motor may be aided by the power generated in the engine during stoichiometric combustion.

A possible timeline of the procedure of FIG. 3 is illustrated in FIG. 4, approximately to scale, and depicts trends of the intake airflow 400, the coupling of the engine to the wheel drive train 402, the coupling of the electric motor to wheel drive train 404, the temperature within the DPF 408, the timing of fuel injection with respect to the combustion cycle of a respective cylinder in DPF combustion operations initiated by the control system 412, the timing of fuel injection with respect to the combustion cycle of a respective cylinder in DPF combustion operations not initiated by the control system 414, and the λ value of the combustion mixture at 416. The initiation of filter protection mode occurs at time 420 and is terminated at time 422. In addition, during the stoichiometric combustion, exhaust gas recirculation can be reduced, or disabled, to increase combustion stability.

In filter protection mode, stoichiometric combustion is achieved by reducing the mass of air delivered to the combustion chambers during intake, or the airflow 400, and/or by increasing fuel injection. Airflow is approximately constant for constant operating conditions up to the initiation of filter protection mode at time 420 at which point the airflow of successive combustions drops to a predetermined stoichiometric level until filter protection mode is terminated at 422. Filter protection mode occurs while the wheel drive train is coupled to the engine as indicated by 402, upon initiation of protection mode the engine is de-coupled from the wheel drive train and may be re-coupled after filter protection mode is terminated. In one example, the engine is uncoupled from each and every drive wheel during the stoichiometric combustion. The electric motor may be de-coupled from the wheel drive train until the initiation of filter protection mode and de-coupled again at termination of filter protection mode at indicated by 404. In other embodiments, the electric motor may remain coupled from the wheel drive train if instructed by the control system for efficiency or to initiate the active regeneration of the DPF. Further, in hybrid systems allowing torque to be provided by the engine and electric motor simultaneously, the engine may remain coupled to the wheel drive train throughout the procedural timeline of FIG. 4. The temperature within the DPF 408 may be determined by sensors in the exhaust system or the DPF itself. DPF temperature may rise until a threshold 406 is reached, at which point the filter protection mode is initiated. Following filter protection mode initiation, the temperature may continue to rise briefly (not shown) before declining in response to the methods initiated by the activation of filter protection mode that may comprise of reduction of airflow, stoichiometric operation, and advanced ignition timing. When the PDF temperature falls below the threshold 406, the filter protection mode methods may be terminated.

Sample methods of filter protection mode may be initiated during regeneration initiated by a control system. This initiation may be standard or be the result of the degree of soot build-up within the DPF. Intentional regeneration may be initiated, in some part, by the retarding of engine ignition time as indicated by 412. Ignition retardation may cause combustion to occur later in the compression cycle, lessening the available volume of expansion thereby increasing the temperature of exhaust. An increase in exhaust temperature delivered to the DPF may act as a catalyst of soot combustion. However, in the event of filter protection mode initiation, retarded ignition may cease and advanced ignition commence until the process is terminated, at which point the ignition timing may be returned to MBT as indicated in 412.

If DPF regeneration is not induced by the control system, as in 414, ignition timing may be at MBT, however, upon initiation of filter protection mode ignition timing may be advanced until the method is terminated. In other embodiments ignition timing may remain advanced until temperature of the DPF or exhaust has fallen below a secondary threshold. The λ value throughout the timeline is represented by 416, in lean burn engines such as the diesel engine referenced herein, the presiding AFR is greater than the stoichiometric AFR resulting in $\lambda > 1$. Upon initiation of filter protection mode, the AFR is reduced due to reduce air intake until the λ value drops to a value near unity, thus achieving stoichiometric combustion. Upon termination of filter protection mode the λ value may again rise unless the desired operation can be achieved with stoichiometric combustion. However, in lean burn engines, limited operating conditions can be achieved by stoichiometric combustion. Advantageously the decoupling component of the filter protection mode addresses this limitation.

Note that the example process flows described herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily called for to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims are to be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for protecting a DPF in an exhaust of an engine of a motor vehicle from unintentional combustion of soot in the DPF, comprising
    operating the motor vehicle as a hybrid vehicle having at least one electric machine, the motor vehicle to be driven exclusively by the at least one electric machine for at least some time; and
    operating the motor vehicle in a DPF protection mode if unintentional combustion of soot takes place or threatens to take place in the DPF, the DPF protection mode comprising:
        automatically decoupling the engine from a wheel drive train,
        meeting forward propulsion demands by a driver exclusively with the at least one electric machine, and
        operating the engine with stable stoichiometric combustion, where stable stoichiometric combustion comprises where the engine is operated with a lambda value within 2% of one; and
        ending the DPF protection mode when there is no longer a threat of unintentional combustion of soot in the DPF.

2. The method as claimed in claim 1,
    wherein
        during operating the engine in the DPF protection mode the engine drives an electric generator in the motor vehicle, and is operated with an output power which corresponds to a maximum power generating capacity of the electric generator.

3. The method as claimed in claim 1,
    wherein
        the engine is a diesel engine, and the DPF is a diesel wall-flow DPF.

4. A method for a vehicle, comprising:
    responsive to DPF over-temperature, decoupling an engine from a vehicle wheel and propelling the wheel only via an electric motor, the engine continuing to carry out combustion and transitioning to stoichiometric combustion.

5. The method of claim 4 wherein the stoichiometric combustion occurs within a selected engine speed and load range in which stable stoichiometric combustion occurs, the engine speed and load limited to the range while stoichiometric combustion occurs.

6. The method of claim 5 wherein during the stoichiometric combustion, the engine is coupled to an electric machine to generate electrical current for driving the electric motor or charging a battery.

7. The method of claim 6 further comprising adjusting engine operation during the stoichiometric combustion to reduce exhaust temperature.

8. The method of claim 7 wherein the engine operation includes injection timing.

9. The method of claim 8 wherein the adjusting includes advancing injection timing.

10. The method of claim 7 further comprising adjusting engine operation during the stoichiometric combustion to reduce exhaust gas recirculation.

11. The method of claim 4 wherein the engine is a diesel engine.

12. The method of claim 4 wherein the DPF is a wall-flow DPF.

13. The method of claim 4 wherein the stoichiometric combustion is compression ignition combustion.

14. The method of claim 4 wherein the electric motor rotates independently of the engine.

15. The method of claim 4 further comprising terminating the stoichiometric combustion responsive to DPF temperature dropping below a threshold temperature.

16. The method of claim 4, wherein the vehicle is a plug-in hybrid electric vehicle.

17. The method of claim 4 wherein the engine is completely decoupled from the wheel.

18. A method, comprising:
    responsive to DPF over-temperature, decoupling an engine from a vehicle drivetrain such that engine rotation is counteracted only by an alternator, and transitioning to propelling a vehicle wheel only via an electric motor driving the vehicle drivetrain with the engine maintaining combustion through the transition but changing combustion air-fuel ratio to stoichiometric combustion.

* * * * *